US007123624B1

(12) United States Patent
Margon (10) Patent No.: US 7,123,624 B1
(45) Date of Patent: Oct. 17, 2006

(54) SYSTEM AND METHOD FOR SINGLE-POINT TO FIXED-MULTIPOINT DATA COMMUNICATION

(75) Inventor: Kenneth Margon, Oakland, CA (US)

(73) Assignee: Cape Range Wireless, Ltd., West Perth (AU)

( * ) Notice: Subject to any disclaimer, the term of this patent is extended or adjusted under 35 U.S.C. 154(b) by 0 days.

(21) Appl. No.: 09/482,054

(22) Filed: Jan. 13, 2000

Related U.S. Application Data (60) Provisional application No. 60/118,662, filed on Jan. 14, 1999.

(51) Int. Cl.
*H04L 12/413* (2006.01)
*H04J 3/16* (2006.01)
*H04Q 7/00* (2006.01)

(52) U.S. Cl. .................. 370/445; 370/437; 370/329
(58) Field of Classification Search ............... 370/276, 370/277, 278, 279, 280, 281, 282, 294, 314, 370/319, 321, 329, 330, 336, 337, 341, 342, 370/344, 346–348, 431, 439, 442–444, 447, 370/449, 450, 458, 328, 389
See application file for complete search history.

(56) References Cited

U.S. PATENT DOCUMENTS

| | | | | |
|---|---|---|---|---|
| 5,012,469 A | * | 4/1991 | Sardana | 370/348 |
| 5,231,634 A | * | 7/1993 | Giles et al. | 370/348 |
| 5,299,198 A | * | 3/1994 | Kay et al. | 370/347 |
| 5,386,435 A | | 1/1995 | Cooper et al. | |
| 5,396,496 A | * | 3/1995 | Ito et al. | 370/314 |
| 5,481,541 A | * | 1/1996 | Gareh | 370/342 |
| 5,499,243 A | * | 3/1996 | Hall | 370/458 |
| 5,572,546 A | * | 11/1996 | Serfaty et al. | 375/221 |
| 5,602,836 A | | 2/1997 | Papadopoulos et al. | |
| 5,678,186 A | | 10/1997 | Lee | |
| 5,682,604 A | * | 10/1997 | Kashi et al. | 455/38.2 |
| 5,726,984 A | * | 3/1998 | Kubler et al. | 370/349 |
| 5,729,541 A | * | 3/1998 | Hamalainen et al. | 370/337 |
| 5,732,074 A | | 3/1998 | Spaur et al. | |
| 5,745,484 A | | 4/1998 | Scott | |
| 5,751,971 A | * | 5/1998 | Dobbins et al. | 709/238 |
| 5,790,551 A | * | 8/1998 | Chan | 370/458 |

(Continued)

FOREIGN PATENT DOCUMENTS

EP      0 556 012 A2      8/1993

(Continued)

OTHER PUBLICATIONS (Sabretoothed, *CAG Qualcom (CDMA vs. IDMA)*, Jan. 4, pp. 1-7, Internet).

(Continued)

*Primary Examiner*—Steven Nguyen
(74) *Attorney, Agent, or Firm*—Paul, Hastings LLP; Trevor Coddington (57) ABSTRACT

Systems and methods for single-point to fixed-multipoint communication. The invention dynamically allocates bandwidth based on traffic demands, thus providing efficient bandwidth utilization, particularly with bursty or time sensitive data traffic. A system includes a Base Station and a plurality of Remote Stations. The Base Station transmits information to the Remote Stations via a Forward Channel and the Remote Stations transmit information via a Reverse Channel. Before transmitting on the Reverse Channel, each of the Remote Stations listens (monitors) the Reverse Channel to ascertain whether any other Remote Station is transmitting. Remote Stations transmit data only when a Remote Station determines that the channel is clear. The Remote Stations listen in sequential order, eliminating the probability of collisions caused by simultaneous transmissions from Remote Stations. The data traffic is accordingly aggregated, thus providing efficient bandwidth utilization.

68 Claims, 5 Drawing Sheets

U.S. PATENT DOCUMENTS

| | | | |
|---|---|---|---|
| 5,793,762 A * | 8/1998 | Penners et al. | 370/389 |
| 5,796,729 A | 8/1998 | Greaney et al. | |
| 5,862,345 A * | 1/1999 | Okanoue et al. | 709/238 |
| 5,905,719 A * | 5/1999 | Arnold et al. | 370/330 |
| 5,953,322 A * | 9/1999 | Kimball | 370/328 |
| 5,963,557 A * | 10/1999 | Eng | 370/432 |
| 6,058,104 A * | 5/2000 | Snelling et al. | 370/277 |
| 6,078,568 A * | 6/2000 | Wright et al. | 370/312 |
| 6,147,986 A * | 11/2000 | Orsic | 370/349 |
| 6,272,117 B1 * | 8/2001 | Choi et al. | 370/330 |
| 6,484,027 B1 * | 11/2002 | Mauney et al. | 455/421 |
| 6,597,680 B1 * | 7/2003 | Lindskog et al. | 370/347 |

FOREIGN PATENT DOCUMENTS

| | | |
|---|---|---|
| EP | 0556012 | 8/1993 |
| GB | 2 259 387 A | 3/1993 |
| GB | 2259387 | 3/1993 |
| GB | 2293943 * | 4/1996 |
| WO | 9417642 | 8/1994 |
| WO | 9818282 | 4/1998 |
| WO | WO 98/18282 | 4/1998 |
| WO | 9837669 | 8/1998 |
| WO | WO 98/37669 | 8/1998 |
| WO | 9838757 | 9/1998 |
| WO | WO 98/38757 | 9/1998 |
| WO | WO 98/49850 | 11/1998 |

OTHER PUBLICATIONS (Wise, R., Chairman, *Cape Range Announcement IPMA Works*, Aug. 6, 1999, p. 1, Internet).

Wise, R., *Cape Range Announcement—IPMA Works*, Aug. 6, 1999.

Sabretoothed, *CAG Qualcomm (CMDA vs. IDMA)*, Jan. 4, 2000.

* cited by examiner

SYSTEM AND METHOD FOR SINGLE-POINT TO FIXED-MULTIPOINT DATA COMMUNICATION

The present application claims priority under 35 U.S.C. § 119(e) to provisional application 60/118,662 filed on Jan. 14, 1999, the entirety of which is incorporated herein by reference.

FIELD OF THE INVENTION

The present invention relates to data communication, and more particularly, to a method and system for single-point to fixed-multipoint communication.

BACKGROUND OF THE INVENTION

In a conventional single-point to fixed-multipoint data communication system, a base station transmits to fixed remote stations and each of the fixed remote stations, in turn, transmits to the base station. Such systems typically use one or more predetermined and typically internationally adopted communication protocols. These protocols tend to be optimized for particular applications and industries. For example, protocols used for wireless communication tend to be developed and influenced by the telecommunication industry. However, since many of these conventional systems that have communication media interconnecting the base station to the fixed remote stations are terrestrial (e.g., copper or optical fiber medium) the data communication protocols tend to be developed and/or heavily influenced by the computer industry.

A fixed wireless system is generally characterized by a point to multipoint topology where remote stations are fixed at specific locations. Wireless in the Local Loop (WLL) is an example of a point to multipoint topology. Most WLL solutions use a variant one of the major wireless telecommunication protocols such as Frequency Division Multiple Access (FDMA), Time Division Multiple Access (TDMA), or Code Division Multiple Access (CDMA). Systems using these protocols assign and reserve bandwidth for the communication between the remote stations and the base station.

A FDMA-based system assigns a separate channel in an available channel band to each remote station. For instance, in cellular systems these channels are assigned by the base station upon receiving a request for channel from a cellular phone (radio). There is a common channel used for control information that is passed back and forth between the base and remote. A TDMA-based system breaks a channel into time slots. Each remote station is assigned a time slot. If there is no data to be transmitted when the time slot becomes available, the bandwidth is wasted since it is not reallocated to another remote radio. In general, a CDMA-based system uses a non-correlating coding sequence to allow multiple radios to transmit and receive in the same frequency range. In cellular CDMA, a base station assigns a code based on a request from a cell phone. There is a practical limit to the number of codes in use in a sector, thus limiting the number of active channels.

Conventional wireless telecommunication protocols tend to be efficient where there is a continuous flow of information. However, Internet data traffic and modern voice digitizing technology is by its nature bursty in its use of bandwidth. Accordingly, systems using these conventional protocols do not make efficient use of the available channel bandwidth with the bursty data traffic, largely because the assigned channels remain idle whenever their assigned stations are not bursting.

Another drawback associated with existing wireless telecommunications protocols is that they require a base station to communicate and broker bandwidth among the remote stations which causes significant delays. Additionally, these conventional protocols fail to accommodate the various demands of different remote stations at different times because of their inability to dynamically allocate bandwidth based on traffic demand.

Conventional computer-based data communication protocols are typically designed and used for multipoint to multipoint communication. Such protocol are optimized to handle bursty data traffic. Examples of such protocols include Carrier Sense Multiple Access (CSMA) and Carrier Sense Multiple Access/Collision Detection (CSMA/CD) protocols. When optimized, these protocols can make efficient use of the bandwidth. The optimization, however, assumes the multipoint-to-multipoint underlying topology. In addition, because of the lack of channel reservations and due to the inconsistency of burstiness of data traffic, these protocols fail to adequately support time sensitive data traffic, such as digitized voice, at high utilization rate of their bandwidth.

SUMMARY OF THE INVENTION

The present invention is directed to systems and methods for efficient single-point to fixed-multipoint data (data and/or digitized voice) communication. The invention overcomes the drawbacks of conventional systems and protocols, particularly with respect to applications with bursty or time sensitive data traffic, by dynamically allocating bandwidth based on traffic demands.

In one embodiment, wireless data communication is provided in context of Internet Protocol Multiple Access (IPMA) system having a Base Station and a plurality of Remote Stations. In operation, the Base Station transmits data packets to the Remote Stations via a Forward Channel and the Remote Stations transmit data packets to the Base Station. Before transmitting on the Reverse Channel, each of the Remote Stations listens to (monitors) the Reverse Channel to ascertain whether any other Remote Station is transmitting. Remote Stations transmit data only when a Remote Station determines that the channel is clear. The Remote Stations listen in sequential order, eliminating the probability of collisions caused by simultaneous transmissions from Remote Stations.

The invention also efficiently and dynamically aggregates data traffic, thus allowing the entire bandwidth to be utilized. For example, when only one of Remote Stations requires bandwidth, the entire bandwidth is allocated to that Remote station. If multiple Remote Stations need bandwidth, the entire bandwidth is allocated according to the needs of those stations. No Remote Station is denied bandwidth nor is bandwidth wasted on a Remote Station that has no data to send with the teaching of the invention. Furthermore, use of the Reverse Channel is achieved without the overhead of brokering, thereby circumventing associated delays.

Another feature of the invention is that the order in which the Remote Stations listen to the Reverse Channel can be rotated periodically. Thus, equal access for transmission on the Reverse channel is ensured for all Remote Stations.

In another aspect of the invention, Remote Stations are assigned to various zones. Remote Stations in a given zone listen only to other Remote Stations in that zone. This reduces the hardware cost associated with Remote Stations since zones can be configured for those stations within a close geographical proximity of each other. Alternately, Remote Stations can be grouped in zones based on station type, data traffic type, or access rate requirements for the Reverse Channel.

Another advantage of the invention is that constraints on distance from the Base Station are removed. For example, embodiments of the invention allow communication over wireless distances in excess of 50 Km from a Base Station in 2 GHz bands.

In addition, embodiments of the invention are more efficient than CDMA. For example, if CDMA cellular system carries 30 simultaneous phone conversations in one cell sector, the invention can carry 240 simultaneous phone conversations using only one correlating code.

The foregoing, and other features and advantages of the invention, will be apparent from the following, more particular description of the preferred embodiments of the invention, the accompanying drawings, and the appended claims.

DETAILED DESCRIPTION OF THE INVENTION

The preferred embodiments of the invention are now described with reference to the figures where like reference numbers indicate like elements. Also in the figures, the left most digit of each reference number corresponds to the figure in which the reference number is first used.

These preferred embodiments are discussed in the context of a single-point to fixed-multipoint wireless data communication in an Internet Protocol Multiple Access (IPMA) system. The invention, however, can be practiced to provide information (e.g., data, digitized voice) for a wide range of Internet applications (e.g., e-mail, various Internet applications, etc.). For example, a single-point station can provide Internet connectivity services to the various fixed-multipoint stations to enable users at these multipoint stations to send and receive e-mail, connect with the World Wide Web, or establish digitized voice communications. Moreover, the invention can be practiced in other applications and embodiments as would be apparent to one skilled in the art. For example, the teachings of the invention can be used in a non-wireless communication medium, such as a copper-based or fiber optics-based communication medium. One such embodiment of the invention, can be a local area network having a single-point to fixed-multipoint topology.

Figure 1:
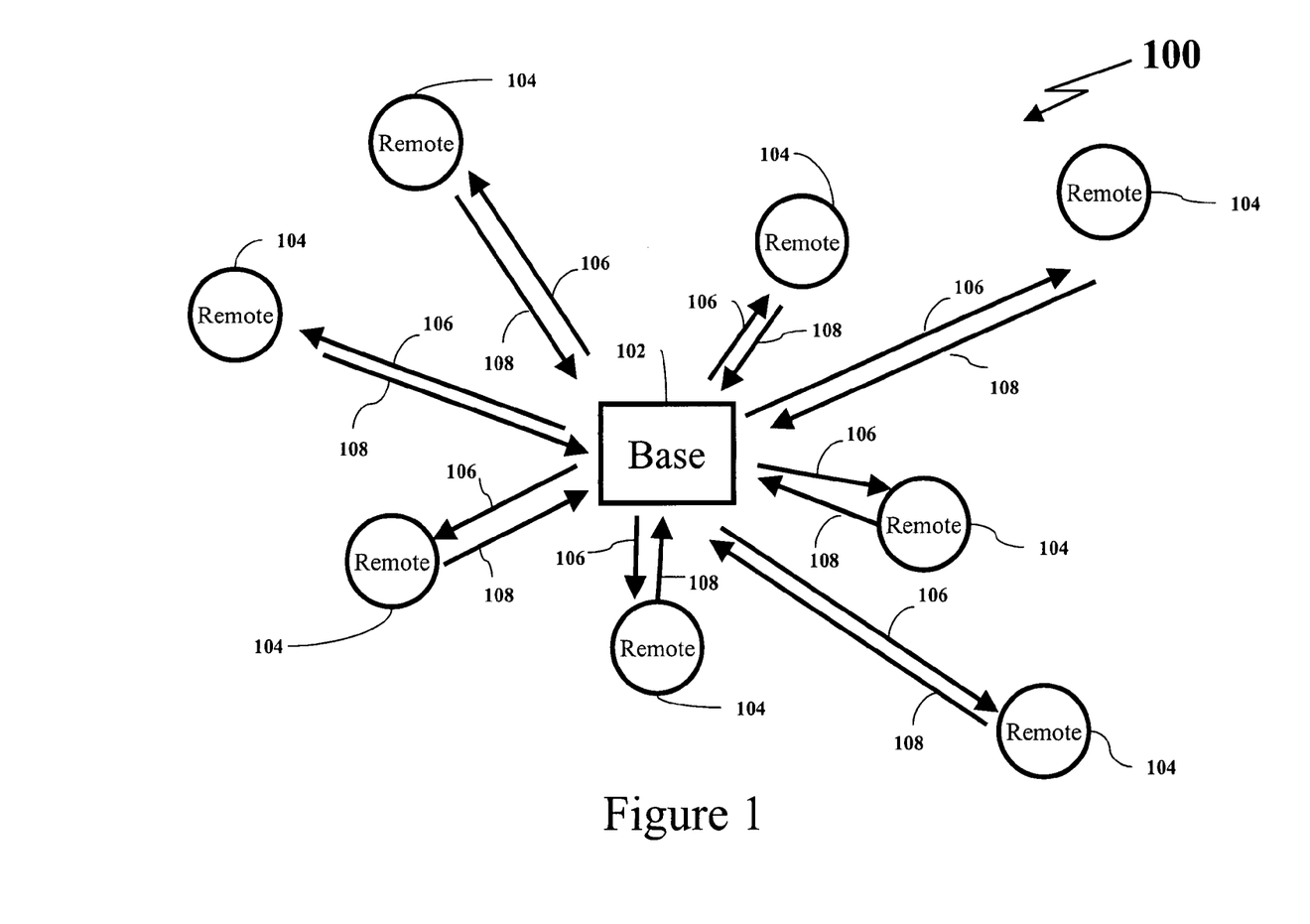
FIG. 1 is a topological view of a single-point to fixed-multipoint wireless data communication system in accordance with the invention.

FIG. 1 is a topological view of a single-point to fixed-multipoint wireless data communication system 100 in accordance with the invention. System 100 includes a Base Station 102, and a plurality of Remote Stations 104. Communication from and to Base Station 102 and each of the Remote Stations 104 is provided over a Forward Channel (FC) 106 and a Reverse Channel (RC) 108, respectively. In this embodiment, FC 106 and RC 108 are modulated over carrier signals in the 2 GHz frequency range. As would be apparent to one skilled in the art, other types of modulation techniques and carrier signals can be readily utilized with the invention. In this embodiment, Base Station 102 provides an Internet connection and data (e.g., e-mail) can be downloaded to the Remote Stations 104, via FC 106, and Remote Stations 104 can upload data via RC 108.

Figure 2A:
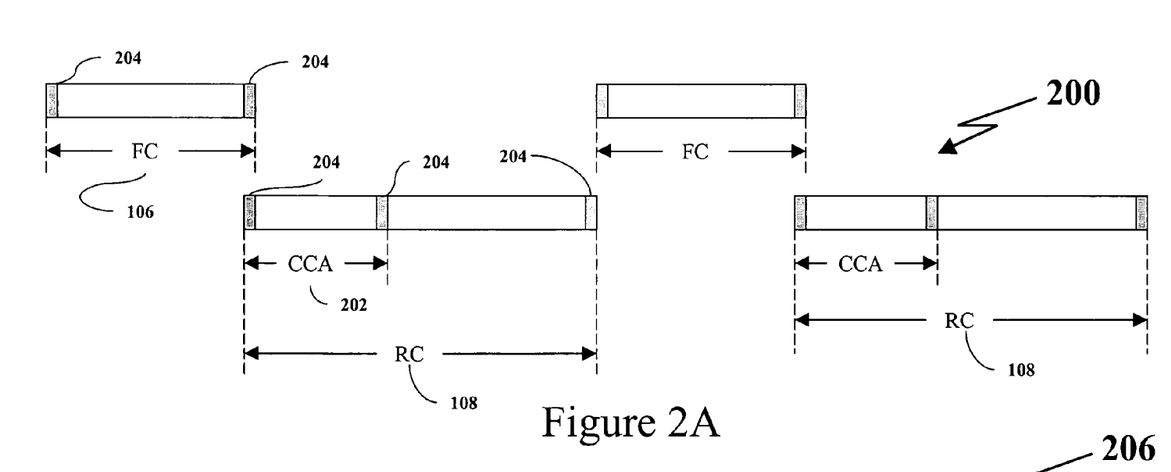
FIGS. 2A and 2B, respectively, are high level views of a half-duplex and a full-duplex system using a Forward Channel and Reverse Channel in accordance with the invention.

The communication between Base Station 102 and each Remote Station 104 can be conducted with a half- or full-duplex embodiments. FIG. 2A is a high level view of a half-duplex embodiment 200 of the invention. In this embodiment, Base Station 102 first transmits to each Remote Station 104 via FC 106. During this time interval, each Remote Station 104 tunes (switches) to the frequency of FC 106 and receives data packets (or data packet) transmitted by Base Station 102. The time interval allotted for FC 106 is based, in part, on the time requirements for Base Station 102 to transmit (or burst) data and each Remote Stations 104 to receive the data.

Base Station 102 can dynamically communicate with Remote Stations 104 in a number of different addressing schemes. For example, for each FC 106, a data packet can be destined for a specific Remote Station 104, all Remote Stations 104, or a subset (pre-assigned group) thereof. Data packets destined for a specific Remote Station are marked by a unique address that is assigned a priori to each Remote Station 104. In such an instance, each Remote Station 104 detects FC 106, but only the Remote Station with a matching address will process the received data and the remaining Remote Stations 104 will discard the transmitted data packets. Data packets destined to all Remote Stations 104 are marked by a broadcast address. Upon detection of FC 106, each Remote Station 104 will recognize the broadcast address and process the received data. Data packets destined for a subset of Remote Stations 104 are marked by a special address, thereby providing a semi-broadcast type of communication.

The foregoing addressing scheme of the invention can be readily mapped into higher level protocols, such as the widely used Internet Protocol (IP). In such an embodiment, the address of each Remote Station 104 can correspond to the IP address of that Remote Station 104. Alternatively, the Remote Station IP address itself can be used directly within the addressing scheme of embodiments of the invention. The advantage of this later embodiment is the elimination of added complexity of mapping and the easier interface to the Internet, or other IP networks, via the Base Station 102. Moreover, in such IP embodiments, existing higher level networking communication software and hardware can be utilized with the invention. For instance, data packets that are meant to be sent to all Remote Stations 104 can use the default addressing broadcast scheme of IP. These types of data packets can include control data that can be used for overall system management, provisioning, control, or merely to broadcast user information to the Remote Stations 104. Data packets that are meant to be sent to a specific Remote Station 104 will have the IP address of that specific station. Accordingly, only that specific Remote Station will unpack that data packet at its networking layer while all other Remote Stations 104 will simply discard that packet. Another advantage of using the IP protocol, as an addressing scheme, is the ability to create zones that correspond to one or more sub-networks of the IP network. Accordingly, such embodiments of the invention can be configured so that a subset of the Remote Stations 104 exist in one IP sub-network or zone.

Returning to FIG. 2A, once the time allotted for FC 106 has expired, each Remote Station 104 switches to listen to the frequency of RC 108 and enters into a Clear Channel Assessment (CCA) 202 phase. During this time, each Remote Station 104 listens to RC 108 to ascertain whether other Remote Stations 104 are transmitting. If a first Remote Station, which has data packets to send to Base Station 102, ascertains that none of the other Remote Stations 104 is transmitting, the first Remote Station transmits its data packets to Base Station 102 until the time allotted for RC 108 expires. Since each Remote Station 104 listens to all transmissions originating from any other Remote Stations 104, each Remote Station 104 detects the transmission of the first Remote Station and refrains from transmitting. Further discussion of these features of the invention is provided below. Once the time allotted for RC 108 expires, all Remote Stations 104 switch their listening frequency again to re-tune to FC 106 and Base Station 102 begins to transmit another occurrence of FC 106 to Remote Stations 104.

In accordance with the invention, each Remote Station 104 thereby determines whether or not to transmit data (by monitoring the RC 108). In this regard, the embodiments of the invention do not require Base Station 102 to broker or provide access to RC 108 among Remote Stations 104. Accordingly, any propagation delay associated with the brokering is circumvented.

To facilitate the requisite handshaking and low error rate communication between Base Station 102 and Remote Stations 104, these stations are synchronized. Methods for synchronizing communication systems are well known in the art and can be readily employed with the embodiments of this invention. For example, synchronization can be achieved during the initial configuration of system 100 and can be maintained by broadcast control packets transmitted from Base Station 102.

The invention also provides Guard Times (GT) 204 to accommodate for delays associated with embodiments thereof and to optimize each embodiment to specifications of that embodiment (e.g., extremely low error rate, minimized synchronization time, etc.). As noted before, the invention can be practiced, with various applications, topologies, and station designs. Each embodiment will require the compensation for propagation delays associated with FC 106 and RC 108 transmissions (a function of the distance between the stations) and delays associated with the circuitry (hardware), processing, and frequency switching of the stations. It would be apparent to one skilled in the art how to calculate or measure such delay times.

In the present embodiment, GT 204 are placed at the beginning and end of FC 106, RC 108 and CCA 202. Other GT 204 arrangements, however, can be used to accommodate for aforementioned and other delays. For example, an embodiment of the invention can have GT 204 placed at the beginning and at the end of FC 106, at the end of RC 108, and at the end CCA 202.

Figure 2B:
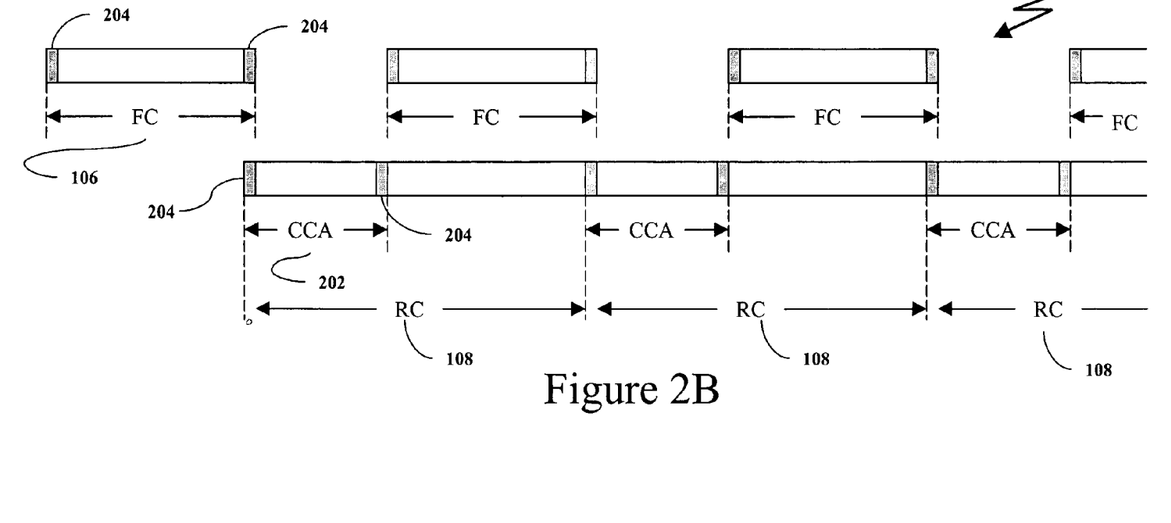

FIG. 2B is a high level view of a full-duplex embodiment 206 of the invention. The main difference between this embodiment and the aforementioned half-duplex embodiment is that the transmission of FC 106 overlaps with the transmission of RC 108. The transmission of FC 106, however, does not occur during the CCA 202 phase of RC 108. Accordingly, the transmission of FC 106 begins after the expiration of the time allotted for the CCA 202 phase. As illustrated in FIG. 2B, FC 106 can last for a period that equals the time remaining for the RC transmission 108. As with half-duplex embodiments of the invention, full-duplex embodiments can utilize GT 204 to accommodate for various delays.

Figure 3:
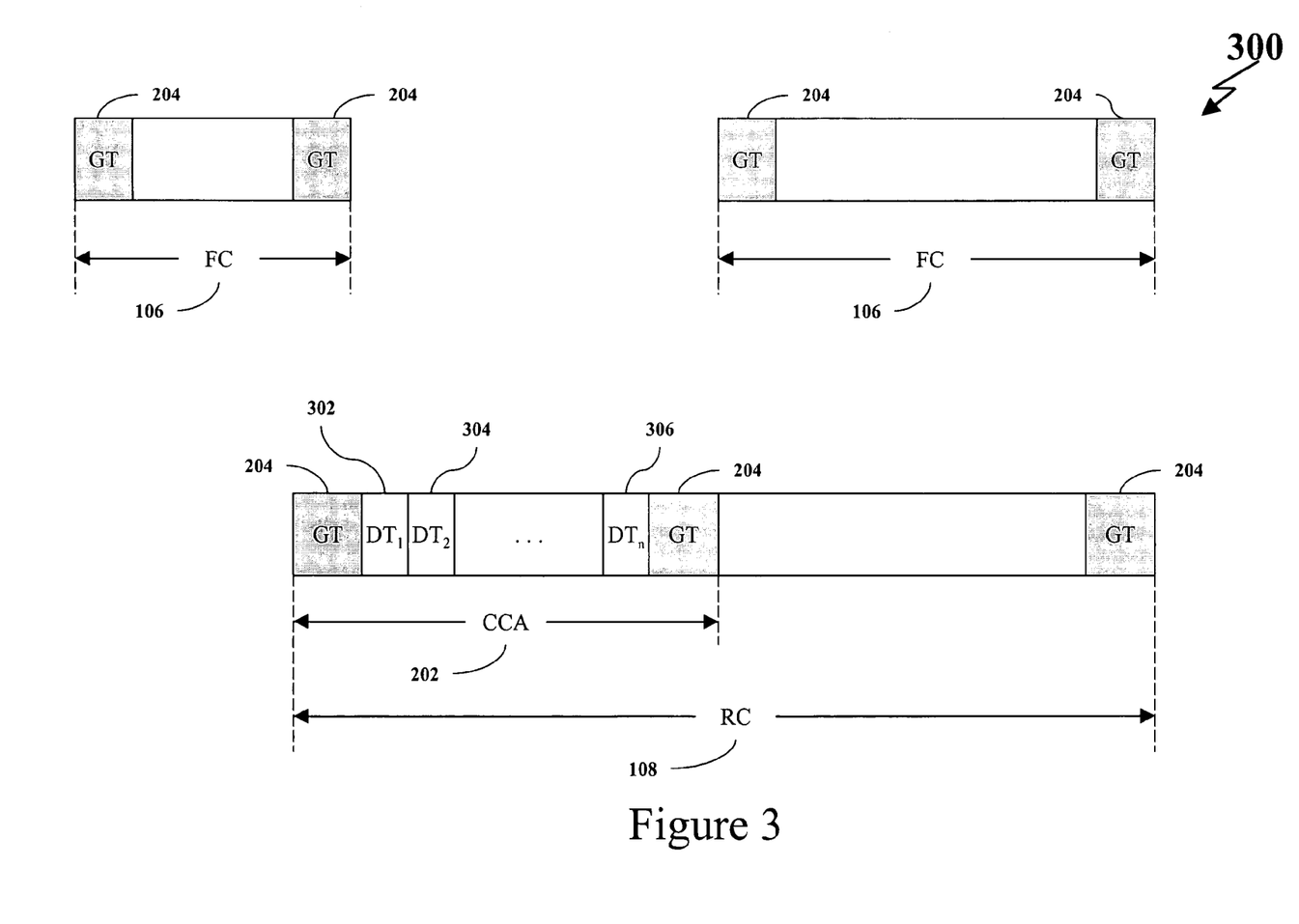
FIG. 3 is a detailed view of a Forward Channel, a Reverse Channel, and a Clear Channel Assessment phase in accordance with the invention.

FIG. 3 is a detailed view of FC 106, RC 108, and CCA 202 and illustrates the operation of a full-duplex embodiment of the invention 300. Initially, Remote Stations 104 are tuned to listen to the frequency of FC 106. After the time allotted for FC 106 expires, each Remote Station 104 re-tunes to the frequency of RC 108 and begins to listen to this channel. This marks the beginning of the CCA 202 phase.

In this embodiment, CCA 202 is divided into periods of time, Dwell Time (DT) of equal time duration. However, other embodiments of the invention can use DT of various time durations. As illustrated in FIG. 3, in there are "n" DT periods (e.g., $DT_1$ 302, $DT_2$ 304, and $DT_n$ 306). In general, each Remote Station 104 is dynamically assigned a particular DT period and listening occurs in a serial manner. Each Remote Station 104 listens to RC 108 during its designated DT and if during its DT the channel clear, that station can transmit data. More specifically, during the CCA 202 phase, each Remote Station 104 waits until its assigned DT to listen RC 108. A first Remote Station (e.g., a Remote Station designated an identification (Id) of one) with $DT_1$ 302 listens first to RC 108. After the expiration of $DT_1$ 302, a second Remote Station (e.g., a Remote Station designated with an Id of two) listens to RC 108 for the period of $DT_2$ 304. Similarly, an "$n^{th}$" Remote Station waits until the beginning of $DT_n$ 306 to listen to RC 108 for that DT period. A Remote Stations that has data to send to Base Station 102 does so only when that Remote Station has listened to RC 108, at its designed DT, and has ascertained that no other Remote Station 104 is transmitting (i.e., that a clear channel exists). In the above example, if the first Remote Station has no data to send, that station spends $DT_1$ 302 listening to RC 108 and does no transmission (even if a clear channel exists).

The second Remote Station starts to listen to RC 108, at $DT_2$ 304, and assesses whether or not a clear channel condition is met. In this example, the channel is clear as the preceding Remote Station (i.e., the first Remote Station) did not have any data and no other station (e.g., an "$n^{th}$" Remote Station) has had the opportunity to transmit yet. If the second Remote station does not have data to transmit it listens to RC 108 during $DT_2$ 304 without any transmission over RC 108, in the same fashion as the first Remote Station. If, however, the second Remote Station does have data to transmit it does so over RC 108 immediately after the station assesses that a clear channel is present. In accordance with the invention, the second Remote Station will transmit all its data during the time allotted for this occurrence of RC 108 or until the RC expires. Once $DT_2$ 304 has expired, and during $DT_n$ 306, the "$n^{th}$" Remote Station begins to listen to RC 108 and detects that the second Remote Station is still transmitting data. Accordingly, the "$n^{th}$" Remote Station assesses that RC 108 is not a clear channel (busy) and does not transmit any data (if it had any) during this particular RC 108 period.

In order to ensure that all Remote Stations 104 have equal opportunity to transmit data to Base Station 102, the order of DT (e.g., 302, 304, and 306) must be changed during successive RC occurrences. Otherwise, Remote Stations 104 with a low order DT (in this example, the first and second Remote Stations) would always have a higher priority to send data than Remote Stations with a higher order DT (in this example, the "$n^{th}$" Remote Station).

Figure 4:
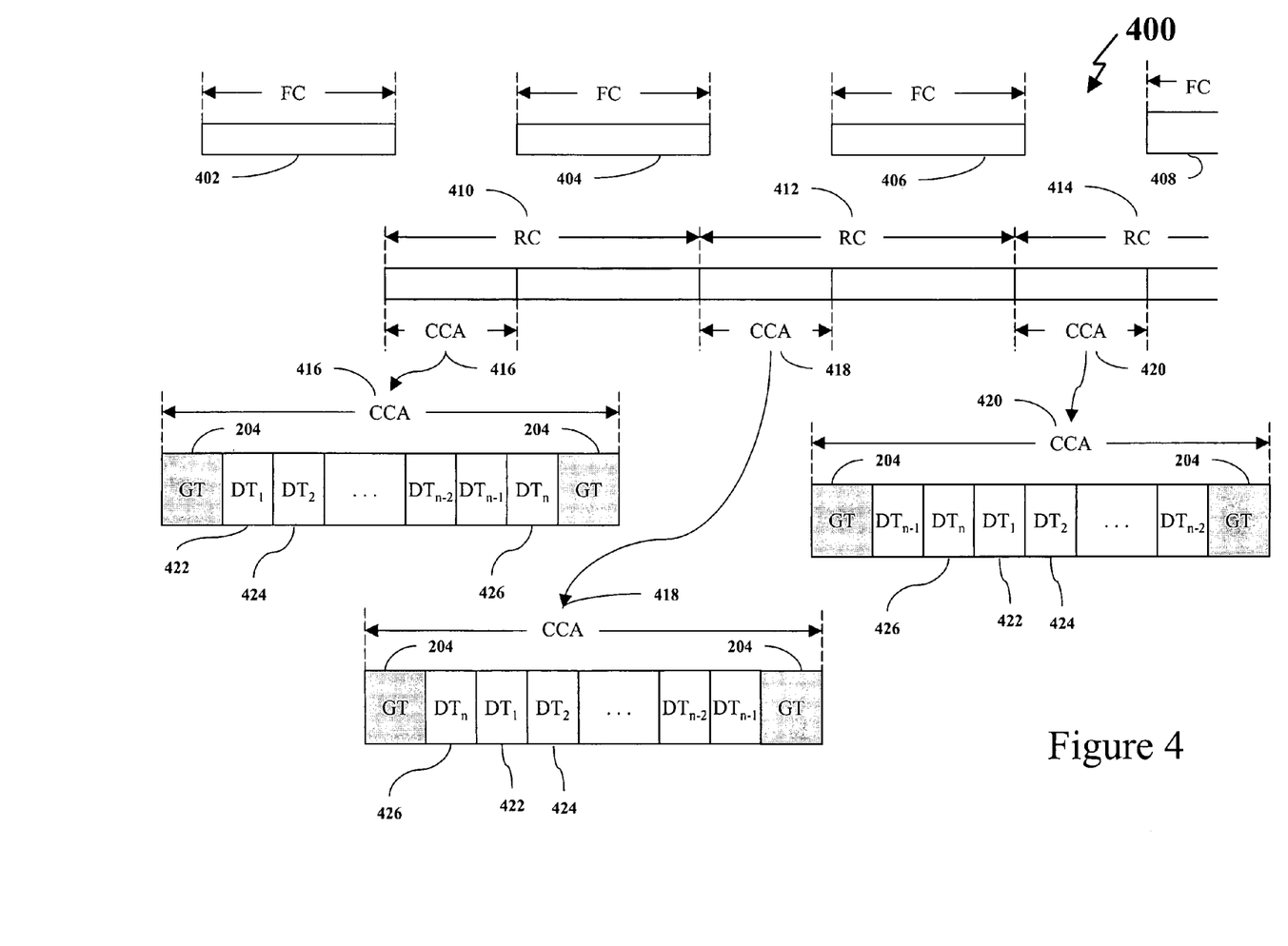
FIG. 4 is a detailed view of a successive series of Forward Channel, Reverse Channel, and Clear Channel Assessment occurrences with Dwell Time rotation in accordance with the invention.

FIG. 4 is a detailed view of a series of FC (402, 404, 406, 408), RC (410, 412, 414), and CCA (416, 418, 420) occurrences with DT rotation, in a full-duplex embodiment 400 of the invention. After FC 402 and at the beginning of RC 410, a first Remote Station listens to the channel during $DT_1$ 422. Next, a second Remote Station listens during $DT_2$ 424 and finally an "$n^{th}$" Remote Station listens during $DT_n$ 426. The DT are then rotated in a round robin fashion for the next RC occurrence (RC 412). As illustrated in FIG. 4, during RC 412, the Remote Station that listened last (in this example, the "$n^{th}$" Remote Station) will listen first, as its $DT_n$ 426 is shifted to the beginning of CCA 418. The other Remote stations DT are shifted to occur later in time by a period equal to $DT_n$. Over time of the operation the rotation provides each Remote Station 104 with an equal opportunity to transmit data. As would be apparent to one skilled in the art, assignment and the changing of DT order can readily be achieved with other algorithms other than the round robin schemes above. Equal access to the bandwidth is an important feature for those embodiments that support time sensitive traffic or require small and consistent delays. For instance, voice over IP requires not only small delays, but also consistent delay, because large variations of delay tend to cause jitter. Moreover, embodiments of the invention can be implemented with other DT structures. For example, one or more Remote Stations can be assigned a predetermined and fixed DT slot. With such embodiments, priority to certain Remote Stations can be achieved.

Figure 5:
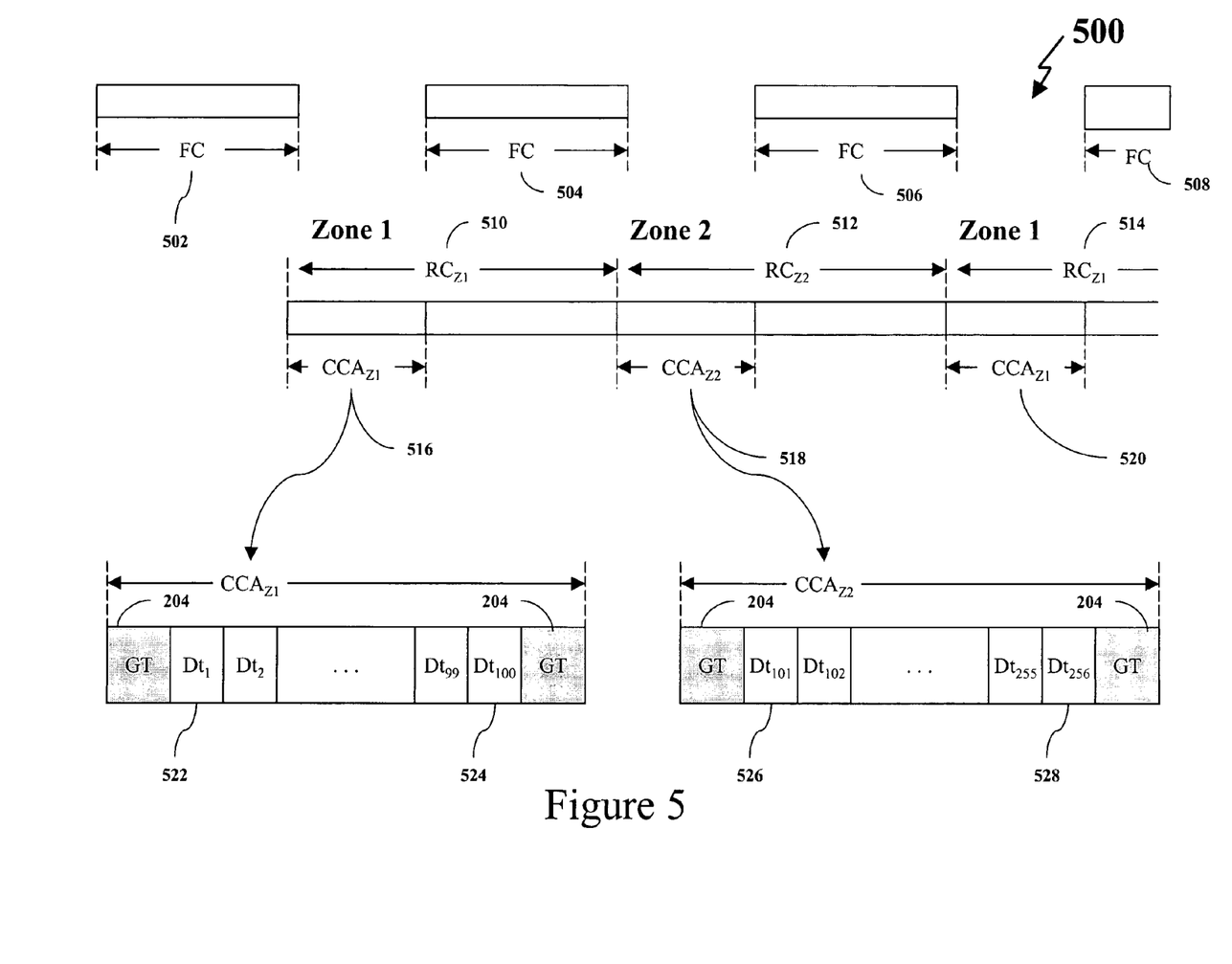
FIG. 5 is a detailed view of a successive series of Forward Channel, Reverse Channel, and Clear Channel Assessment occurrences with two-zones in accordance with the invention.

As noted above, the invention can be practiced with multiple zones. FIG. 5 is a detailed view of a series of FC (502, 504, 506, 508), RC (510, 512, 514), and CCA (516, 518, 520) in a two-zone (Zone 1 and 2) embodiment 500 of the invention. In this embodiment, Remote Stations 104 assigned Id addresses 1 through 100 are configured in Zone 1 and Remote Stations assigned Id address 101 through 256 are configured in Zone 2. Remote Stations, in Zone 1, transmit at a first occurrence of a Reverse Channel (in this instance, RC 510). Remote Stations, in Zone 2, transmit at a second occurrence of the Reverse Channel (in this instance, RC 512). Thereafter, Remote Stations, in Zone 1, transmit again at the following occurrence of a Reverse Channel (in this instance, RC 514) and so forth. In this preferred embodiment, Remote Stations within a given zone only listen to the Remote Stations in their zone.

In this preferred embodiment, the changing of the DT order occurs independently in each zone and the rotation scheme disclosed above is utilized. Accordingly, DT associated with Remote Stations in Zone 1 (in this instance, $DT_1$ 522 through $DT_{100}$ 524) are rotated at each Reverse Channel in which Zone 1 Remote Stations can transmit (in this instance, RC 510 and RC 514). Correspondingly, DT associated with Remote Stations in Zone 2 (in this instance, $DT_{101}$ 526 through $DT_{256}$ 528) are rotated at each Reverse Channel occurrence such stations are assigned to transmit (in this instance, RC 512).

The use of zones allows for the grouping of those Remote Stations that are close in proximity to each other. The transmission hardware (e.g., antennas) of Remote Stations is thus kept at a minimum because each Remote Stations only has to listen to those Remote Station in its assigned zones. In addition, such embodiments of the invention allow the maintenance of a single Base Station in a spacious geographical area while minimizing the cost of the hardware at the Remote Stations due to their grouping in zones of smaller geographic areas.

Alternatively, Remote Stations can be grouped in zones that correspond to a type of service. Because the changing of DT occurs for each zones independently, those zones having fewer Remote Stations have a higher access rate for each of their Remote Stations. For instance, Zone 1 in FIG. 5 has 100 Remote Stations while Zone 2 has 155 Remote Stations. Thus, the DT of each Remote Station in Zone 1 is rotated at a faster rate than DT of a Remote Station in Zone 2. Accordingly, Remote Stations at Zone 1 will have a higher overall access rate than Remote Stations in Zone 2.

It would be apparent to one skilled in the art that the configuration of zones and their corresponding addresses is a matter of network design, and the methods used are well known in the art. For example, a class-C IP sub-network can be assigned to a single zone with embodiments of the invention. Alternately, IP masking can be used to assign smaller or larger IP sub-networks to zones in such embodiments.

Although the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A system, comprising:
a base station that provides a forward channel signal; and
a plurality of remote stations, wherein each remote station monitors said forward channel signal, monitors a reverse channel within an assigned period of time in a clear channel assessment interval, and provides a reverse channel signal when said reverse channel is clear within said assigned period of time, wherein said clear channel assessment interval is partitioned into periods of time and each of said periods of time is assigned to one of said plurality of remote stations, and said forward channel signal is provided during a predetermined forward channel interval and said reverse channel signal is provided during a predetermined reverse channel interval.

2. The system of claim 1, wherein said base station receives information encoded on said reverse channel signal and wherein each remote station receives information encoded on said forward channel signal.

3. The system of claim 1, wherein said forward channel signal and said reverse channel signal include data packets.

4. The system of claim 3, wherein said data packets include digitized voice and data.

5. The system of claim 1, wherein said forward channel includes an address.

6. The system of claim 5, wherein each remote station is assigned a unique remote station address and wherein each remote station accepts information encoded on said forward channel signal when said address of said forward channel signal matches said assigned unique remote station address.

7. The system of claim 5, wherein a remote station address is assigned a priori to said remote station.

8. The system of claim 5, wherein said address is a broadcast address.

9. The system of claim 5, wherein said address is a semi-broadcast address.

10. The system of claim 5, wherein said address corresponds with an Internet Protocol address.

11. The system of claim 5, wherein said address is an Internet Protocol address.

12. The system of claim 5, wherein one remote station is assigned a first remote station address from a first set of addresses and a second remote station is assigned a second remote station address from a second set of addresses.

13. The system of claim 12, wherein said first set of addresses form a first zone and said second set of addresses form a second zone.

14. The system of claim 5, wherein each remote station is assigned a remote station address from a set of addresses and said set of addresses form an Internet sub-network.

15. The system of claim 1, wherein said assigned period of time is a predetermined dwell time and wherein each of said remote stations monitor said clear assessment channel interval during said predetermined dwell time.

16. The system of claim 15, wherein each of said dwell times is of equal duration.

17. The system of claim 15, wherein each remote station is dynamically assigned a dwell time.

18. The system of claim 17, wherein said dwell times are assigned to said plurality of remote stations in a round robin fashion.

19. The system of claim 1, further comprising guard times among said forward channel interval, said reverse channel interval, and said clear channel assessment interval.

20. The system of claim 19, wherein said guard times are positioned at the beginning and end of said forward channel interval, said reverse channel interval, and said clear channel assessment interval.

21. The system of claim 19, wherein said guard times are positioned at the beginning and end of said forward channel interval and at the end of said reverse channel interval and said clear channel assessment interval.

22. The system of claim 1, wherein the system is an Internet Protocol Multiple Access environment.

23. The system of claim 1, wherein said forward channel signal and said reverse channel signal are wireless signals.

24. The system of claim 21, wherein said forward channel signal and said reverse channel signal are modulated signals each having carrier signals with a frequency of approximately 2 GHz.

25. The system of claim 1, wherein said forward channel signal and said reverse channel signal are each electrical signals transmitted in an electrical medium.

26. The system of claim 1, wherein said forward channel signal and said reverse channel signal are each optical signals transmitted in an optical medium.

27. The system of claim 1, wherein said forward channel signal and reverse channel signal are half-duplex signals.

28. The system of claim 1, wherein said forward channel signal and reverse channel signal are full-duplex signals.

29. The system of claim 1, wherein said base station synchronizes with a portion of said plurality of remote stations.

30. The system of claim 27, wherein said base station uses broadcast control packets for synchronization.

31. A method for a single-point to a fixed multi-point system having a base station and a plurality of remote stations, the method comprising the step of:
  transmitting from the base station a forward channel signal;
  monitoring for said forward channel signal at each of the plurality of remote stations; and
  monitoring a reverse channel at each of the plurality of remote stations, wherein each of the plurality of remote stations monitors said reverse channel within an assigned period of time in a clear channel assessment interval, wherein said clear channel assessment interval is partitioned into periods of time and each of said periods of time is assigned to one of said plurality of remote stations, and said forward channel signal is provided during a predetermined forward channel interval and said reverse channel signal is provided during a predetermined reverse channel interval,
  if said reverse channel is clear during said assigned period of time associated with one of the plurality of remote stations and said one of the plurality remote stations has information to send to the base station, transmitting a reverse channel signal from said one of the plurality of remote stations.

32. The method of claim 31, wherein said forward channel signal has data information and address information.

33. The method of claim 32, further comprising the steps of assigning a unique remote station address to each of the plurality of remote stations and accepting said data information at one of the plurality of remote stations when said address matches an unique address of said one of the plurality of remote stations.

34. The method of claim 33, wherein said step of assigning unique remote addresses is done a priori.

35. The method of claim 32, wherein said address information is a broadcast address.

36. The method of claim 32, wherein said address information is an Internet Protocol address.

37. The method of claim 32, further comprising the steps of assigning a first remote station address from a first set of addresses to one of the plurality of remote stations and assigning a second remote station address from a second set of addresses to another of the plurality of remote stations.

38. The method of claim 37, wherein said first set of addresses form a first zone and said second set of addresses form a second zone.

39. The method of claim 32, wherein said forward channel signal and said reverse channel signal include data packets.

40. The method of claim 39, wherein said data packets include digitized voice and data.

41. The method of claim 31, wherein each assigned period of time is a predetermined dwell time.

42. The method of claim 41, wherein each of said dwell times is of equal duration.

43. The method of claim 41, further comprising the step of dynamically assigning dwell times to each of the plurality of remote stations.

44. The method of claim 43, wherein said dwell times are assigned in a round robin fashion.

45. The method of claim 31, further comprising the step of providing guard times among said forward channel interval, said reverse channel interval, and said clear channel assessment interval.

46. The method of claim 45, wherein said guard times are positioned at the beginning and end of said forward channel interval, said reverse channel interval, and said clear channel assessment interval.

47. The method of claim 31, wherein the system is used in an Internet Protocol Multiple Access environment.

48. The method of claim 31, wherein said forward channel signal and said reverse channel signal are wireless signals.

49. The method of claim 31, wherein said forward channel signal and reverse channel signal are half-duplex signals.

50. The method of claim 31, wherein said forward channel signal and reverse channel signal are full-duplex signals.

51. The method of claim 31, further comprising the step of synchronizing the base station with the plurality of remote stations.

52. The method of claim 51, wherein broadcast control packets are used for synchronization.

53. A single-point to a fixed multi-point system, comprising:
a base station for transmitting a forward channel signal; and
a plurality of remote stations, each remote station monitoring said forward channel signal, monitoring a reverse channel within an assigned dwell time in a clear channel assessment interval, and transmitting a reverse channel signal after detecting that said reverse channel is clear, wherein said clear channel assessment interval is partitioned into dwell times, each dwell time assigned to one of said plurality of remote stations, said forward channel signal provided during a predetermined forward channel interval, and said reverse channel signal provided during a predetermined reverse channel interval.

54. The system of claim 53, wherein said forward channel signal has data information and address information.

55. The system of claim 53, further including guard times among said forward channel interval, said reverse channel interval, and said clear channel assessment interval.

56. The system of claim 53, wherein the system is used in an Internet Protocol Multiple Access environment.

57. The system of claim 53, wherein said forward channel signal and said reverse channel signal are wireless signals.

58. The system of claim 53, wherein said forward channel signal and reverse channel signal are full-duplex signals.

59. A method of communicating with a station, comprising the steps of:
monitoring a forward channel;
monitoring a reverse channel within an assigned predetermined dwell time within a clear channel assessment interval, wherein said clear channel assessment interval is partitioned into a number of dwell times, each dwell time assigned to one of a number of remote stations, said number of dwell times being equal to said number of remote stations; and
transmitting a reverse channel signal after detecting that said reverse channel is clear during said predetermined dwell time, wherein said forward channel signal is provided during a predetermined forward channel interval and said reverse channel signal is provided during a predetermined reverse channel interval.

60. A station comprising:
a monitor for monitoring a forward channel signal and monitoring a reverse channel within a clear channel assessment interval, wherein said clear channel assessment interval is partitioned into at least two dwell times, one of said dwell times is assigned to said station with a remainder of said dwell times assigned to other stations, said monitor monitoring said reverse channel only within said dwell time assigned to said station; and
a transmitter for transmitting a reverse channel signal after said monitor detects that said reverse channel is clear during said dwell time, wherein said forward channel signal is provided during a predetermined forward channel interval and said reverse channel signal is provided during a predetermined reverse channel interval.

61. The station of claim 60, wherein said forward channel signal has data information and address information.

62. The station of claim 61, further comprising:
a unique station address, wherein said station accepts said data information when said address information matches said unique station address.

63. The station of claim 60, wherein said forward channel signal and said reverse channel signal are wireless signals.

64. The station of claim 60, wherein said forward channel signal and reverse channel signal are full-duplex signals.

65. A base station comprising:
a transmitter for transmitting a forward channel signal; and
a receiver for receiving a reverse channel signal from one of a number of remote stations after said remote station detects that a reverse channel is clear during a dwell time assigned to said remote station in a clear channel assessment interval, wherein said clear channel assessment interval is partitioned into a number of dwell times, said number of dwell times equal to said number of remote stations, each dwell time assigned to one remote station, said forward channel signal provided during a predetermined forward channel interval, said reverse channel signal provided during a predetermined reverse channel interval, and said clear channel assessment interval occupies a time between said forward and reverse channel intervals.

66. The base station of claim 65, wherein said forward channel signal has data information and remote station address information.

67. The base station of claim 65, wherein said forward channel signal and said reverse channel signal are wireless signals.

68. The base station of claim 65, wherein said forward channel signal and reverse channel signal are full-duplex signals.

* * * * *